UNITED STATES PATENT OFFICE.

WILLIAM P. ROSE, OF IRWIN, COLORADO.

ARTIFICIAL STONE.

SPECIFICATION forming part of Letters Patent No. 279,817, dated June 19, 1883.

Application filed April 5, 1883. (No specimens.)

*To all whom it may concern:*

Be it known that I, WILLIAM P. ROSE, of Irwin, in the county of Gunnison and State of Colorado, have invented certain new and useful Improvements in Artificial Stone; and I do hereby declare that the following is a full, clear, and exact description thereof.

My invention has for its object the production of artificial stone for buildings and other purposes; and it consists in the combination of ingredients, substantially as will be hereinafter set forth.

To enable others skilled in the art to avail themselves of the benefits of my invention, I will proceed to describe how I carry the same into effect.

I first prepare a solution consisting of the following ingredients, in or about the proportions set forth, to wit: five (5) pounds of borax, two (2) pounds of seed-lac, one-half pound of litharge, five (5) pounds of magnesia, one (1) pound bone-ash, and ten (10) pounds rice. To the above is added a sufficient quantity of water and boiled until the whole comes (well incorporated) to the consistency of paste. I then strain the compound and add one hundred (100) gallons of water to each gallon of the above solution, after which one part of Portland or any other suitable cement is thoroughly mixed with three parts of sharp silicious sand or gravel, and the same is then sufficiently dampened with the solution above described to form a plastic material, which is now placed in molds of any desired design or size, and as soon as well set the material is removed therefrom and left to dry from four to five hours, more or less, after which the artificial stone thus made is treated with a solution of two (2) pounds of zinc-white and ten (10) pounds of water-glass mixed with about one hundred (100) gallons water. In about three days the stone is ready for use. In the manufacture of marble I proceed in the same way, with the exception that the litharge, seed-lac, borax, and magnesia are omitted. For coloring I use black oxide of manganese or any other suitable matter. There is obviously many purposes to which my composition, when molded, may be advantageously applied—such, for instance, as paving, roofing, and troughs or receptacles for water, &c.

Having thus fully described my invention, what I claim as new, and desire to secure by Letters Patent, is—

In the manufacture of artificial stone or marble, a solution with which to moisten the material forming the base of said stone, composed of seed-lac, litharge, magnesia, bone-ash, rice, and water, said ingredients being mixed and compounded in about the proportion specified, and for the purpose set forth.

In testimony that I claim the foregoing as my own I affix my signature in presence of two witnesses.

WM. P. ROSE.

Witnesses:
W. R. KEYWORTH,
F. O. McCLEARY.